May 8, 1962 V. R. POWELL 3,033,583
TUBE GRIPPING MECHANISM
Filed March 7, 1960 4 Sheets-Sheet 1

INVENTOR.
VERNON R. POWELL
BY
William C. Babcock
ATTORNEY

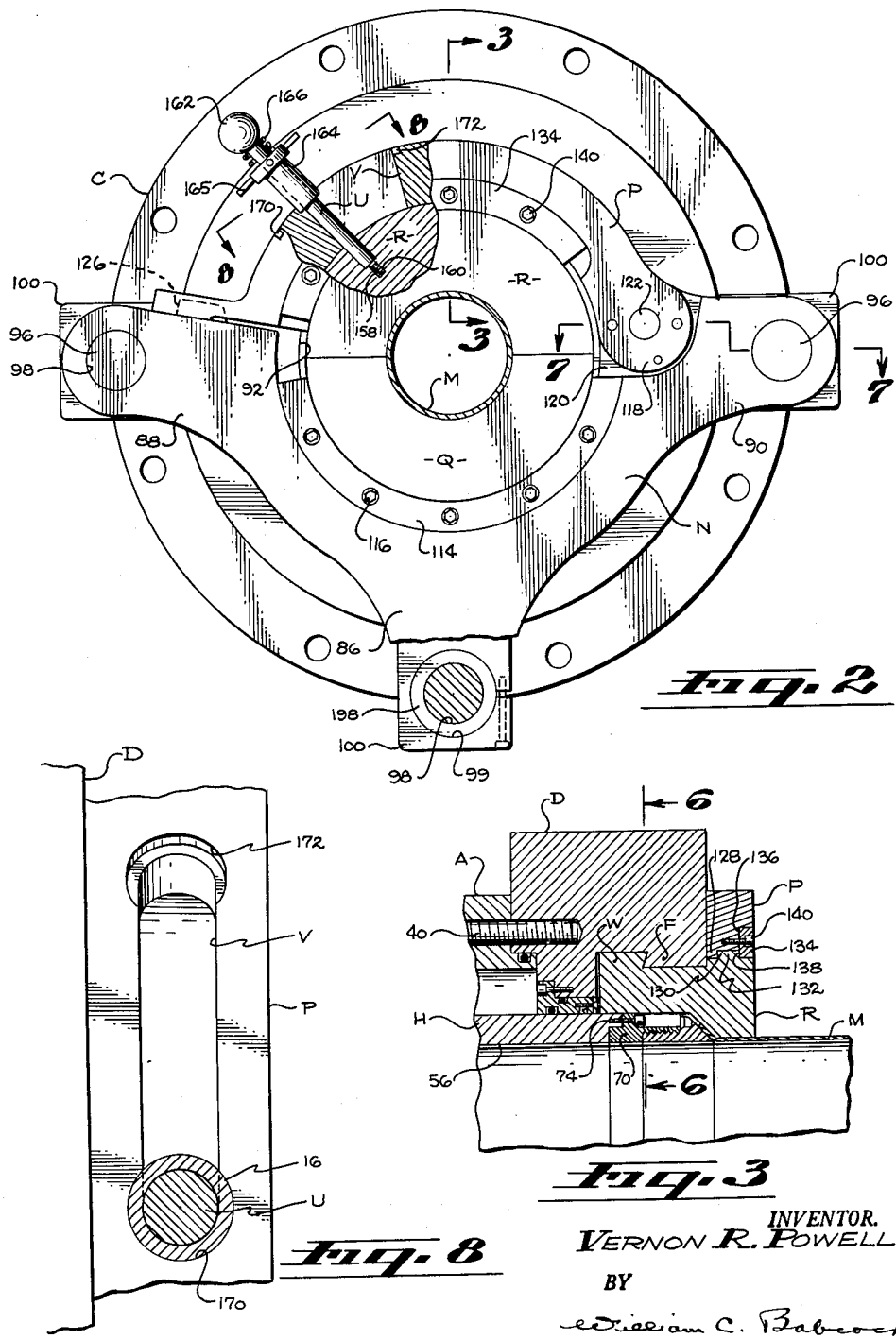

May 8, 1962 V. R. POWELL 3,033,583
TUBE GRIPPING MECHANISM
Filed March 7, 1960 4 Sheets-Sheet 3
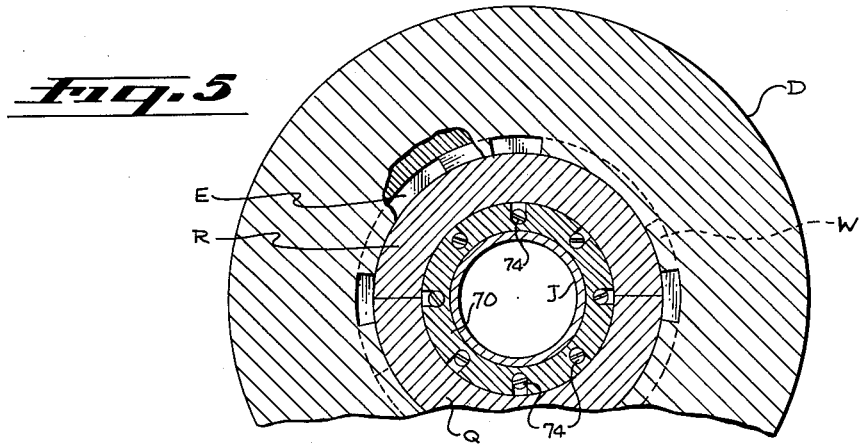
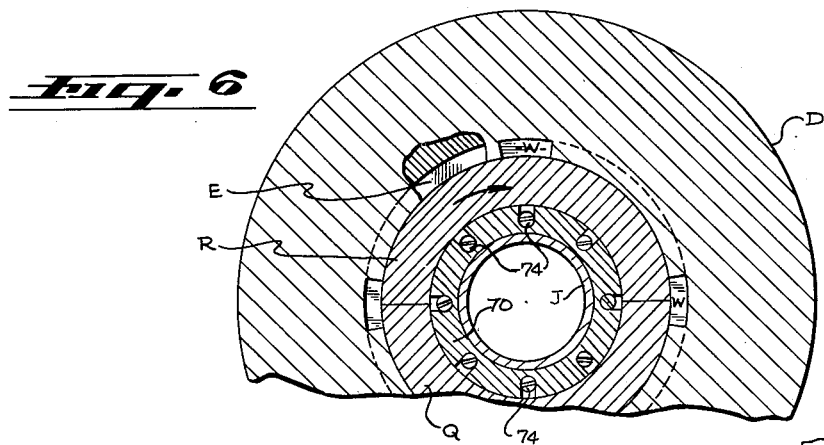
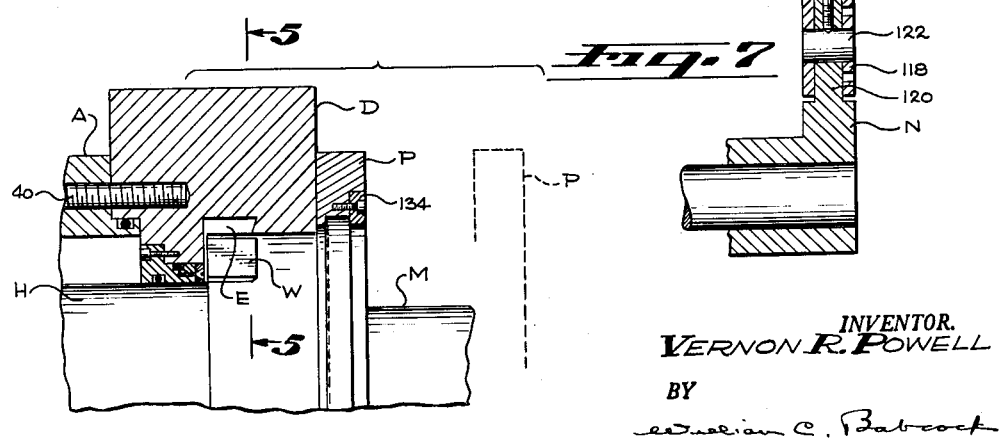
INVENTOR.
VERNON R. POWELL
BY
William C. Babcock
ATTORNEY

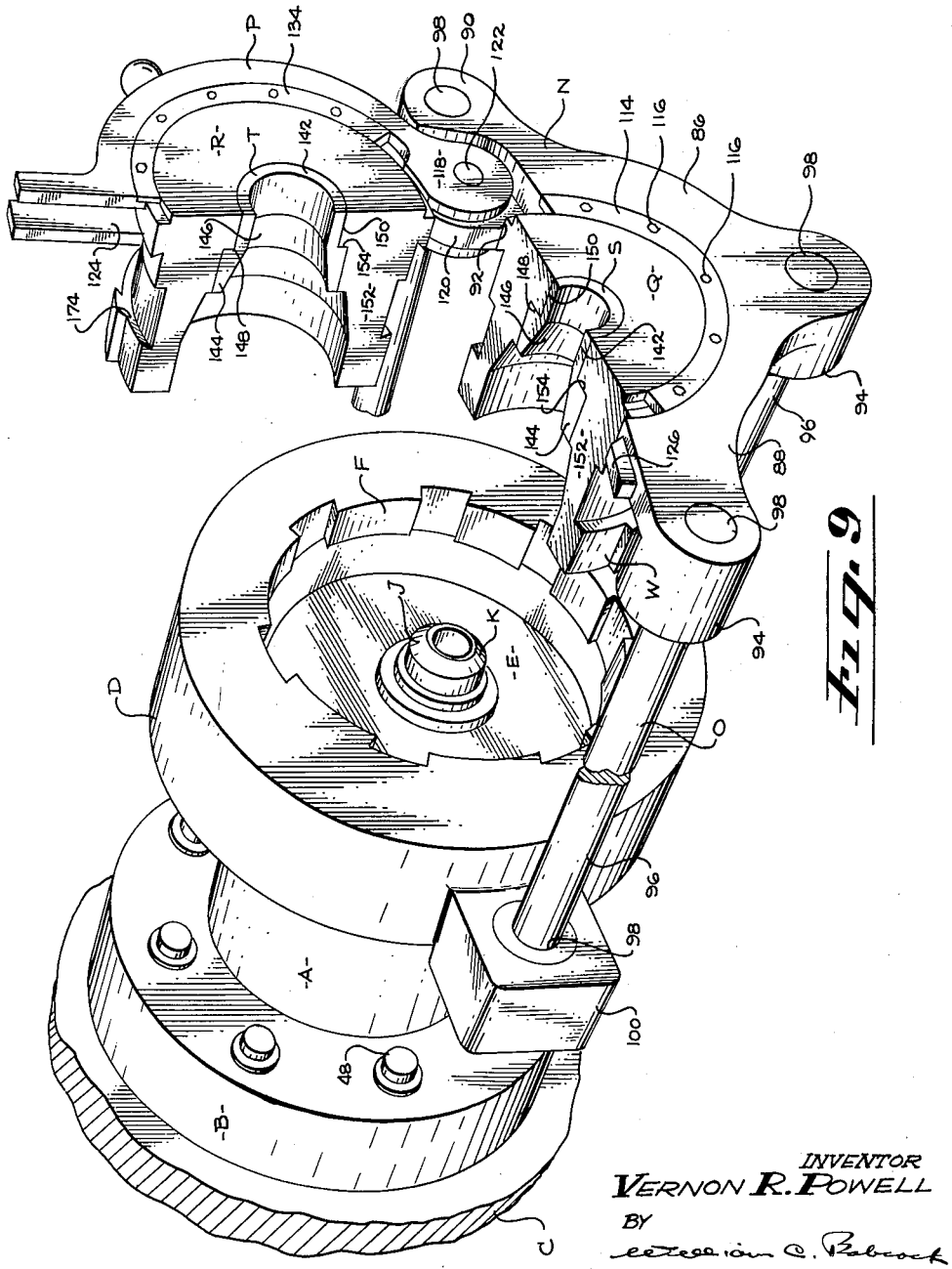

United States Patent Office 3,033,583
Patented May 8, 1962

3,033,583
TUBE GRIPPING MECHANISM
Vernon R. Powell, 35 59th Place, Long Beach 3, Calif.
Filed Mar. 7, 1960, Ser. No. 13,237
9 Claims. (Cl. 279—4)

The present invention relates generally to apparatus for use in the manufacture of tubular products, and more specifically to improved jaws for gripping the flared ends of tubing while work is being performed thereon.

The present invention is adapted to be used whenever it is desired to effect an exceedingly tight grip on the flared end of a tube, and has been found to be particularly useful in removably gripping the flared end of a tube in carrying out the methods disclosed and claimed in copending application Serial No. 512,061, filed in the United States Patent Office on May 31, 1955, entitled Apparatus and Method for Forming Close Tolerance Tubing and Articles Thereon, which issued as Patent No. 2,927,372 on March 8, 1960.

A primary object in devising the present invention is to provide a heavy duty hydraulically actuated gripping jaw for removably engaging the flared end of a tubular member, and one which is capable of remaining so engaged up to any desired maximum tensional load that may be placed on the engaged tubular member, which maximum load is determined by the pressure at which the hydraulic actuating fluid is supplied to the jaws, together with the maximum load the tubular member can withstand without failure.

Another object of the invention is to furnish gripping jaws, which due to the extremely high pressure that may be exerted thereby, permit the jaws to grip and hold a substantially shorter length of tapered end portion of a tubular member than has been possible heretofore.

Still another object of the invention is to provide a tube gripping assembly that is simple and easy to operate, positive in operation, requires a minimum of maintenance attention, and is economical to use in that there is a minimum of waste tubular materials due to the short length of the tapered ends gripped thereby.

A further object of the invention is to provide gripping jaws which are adapted to have an elongate mandrel extended therethrough into the confines of the tubular member that is being gripped by the jaws.

A still further object of the invention is to supply a tube gripping mechanism of such construction that the greater the pressure on the actuating hydraulic fluid, the greater will be the force exerted on the tapered end portion of the tubular member gripped thereby.

Yet another object of the invention is to furnish a tube-gripping mechanism which by means of a simple manual operation may be adapted to grip the flared end of tubular members of various sizes within a predetermined range.

These and other objects and advantages of the invention will become apparent from the following description thereof, and from the accompanying drawings illustrating the same in which:

FIGURE 2 is a front elevational view of the gripping mechanism, portions of which are broken away to show the internal structure thereof;

FIGURE 3 is a fragmentary longitudinal cross-sectional view of the mechanism taken on line 3—3 of FIGURE 2 showing a die carrier and the breech thereof in interlocking engagement;

FIGURE 4 is the same vertical cross-sectional view shown in FIGURE 3, but illustrating the die carrier after it has been rotated out of interlocking engagement with the breech;

FIGURE 5 is a fragmentary transverse sectional view of the invention taken on line 5—5 of FIGURE 4;

FIGURE 6 is a fragmentary transverse cross-sectional view of the invention taken on line 6—6 of FIGURE 3;

FIGURE 7 is a fragmentary transverse cross-sectional view of the invention taken on line 7—7 of FIGURE 2;

FIGURE 8 is a fragmentary top plan view of the mechanism of the present invention taken on line 8—8 of FIGURE 2; and FIGURE 9 is a perspective view of the tube-gripping mechanism showing the upper jaw after it has been pivoted to the open position.

Figure 1:
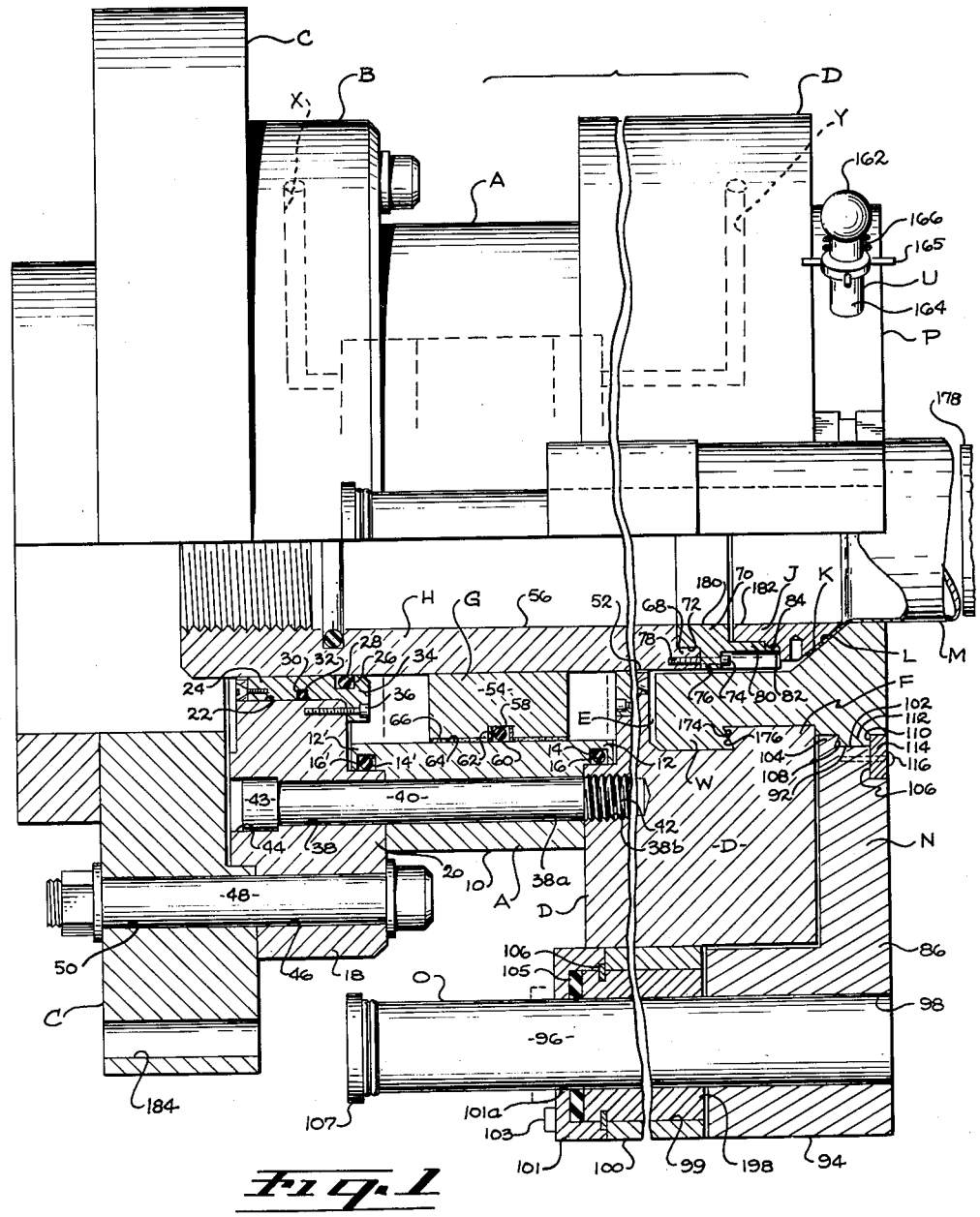
FIGURE 1 is a combined side elevational and longitudinal cross-sectional view of the invention.

With further reference to the drawings for the general arangement of the present invention, it will be seen in FIGURES 1, 2 and 9 thereof to include a horizontally disposed hydraulic cylinder A and a circular flange assembly B affixed to the rear end of the cylinder, which is adapted to be mounted upon any desired portion of a machine such as a flange C, or the like. A cylindrical breech D is affixed to, and serves to close the forward end of cylinder A. The breech D, as can best be seen in FIGURE 9, has a forwardly disposed cavity E formed therein. A number of circumferentially spaced first lugs F project inwardly into the forward portion of cavity E.

A piston G is slidably mounted in hydraulic cylinder A (FIGURE 1), and a piston rod H is affixed thereto. Piston rod H extends longitudinally into cylinder A, with one end of the rod being slidably supported in the flange assembly B and the other end thereof in the breech D. A punch J is mounted on the forward extremity of piston rod H. This punch has a frusto-conical forward face K that is complementary to the interior face of a flared end L of a tube M to be removably gripped by the invention. Located forwardly from the lower portion of breech D is a first jaw N. First supporting means O permit longitudinal movement of jaw N relative to breech D. A second jaw P is pivotally mounted on a side portion of jaw N, as may best be seen in FIGURE 8.

First and second semi-cylindrical die holders Q and R are provided that are rotatably but removably supported within the confines of the first and second jaws N and P respectively. Also, first and second semi-cylindrical dies S and T in the form of inserts are provided, which may be removably mounted in the die holders Q and R respectively (FIGURE 9). A pin U projects radially outwardly from die holder R, as shown in FIGURE 2, and is adapted to partially rotate the die holders Q and R when the jaws N and P are closed. Pin U is movable within a slot V formed in jaw P. When pin U is in a first position in slot V it indexes the die holders Q and R so that circumferentially spaced lugs W formed on the rear portion of the die holders can be moved rearwardly in the spaces between the first lugs F to place the lugs within the confines of cavity E. After the second lugs W are so disposed, pin U is moved to a second position in slot V whereby the second lugs are then moved to a second position as may be seen in FIGURES 3 and 6 where the die holders Q and R are in interlocking engagement with breech D.

A fluid inlet passage X (FIGURE 1) is provided which permits hydraulic fluid at a desired pressure to be introduced into the rear portion of cylinder A to force the piston G, rod H and punch J forwardly relative to the breech D. The flared end L of the tube M (FIGURE 1), is then pressure-gripped between the tapered faces of dies S and T and face K. Obviously, the greater the pressure on the hydraulic fluid, the greater will be the force exerted by face K on the flared end L to frictionally grip the same when sandwiched between face K and the tapered faces of dies S and T.

After the work on tube M has been completed, the pressure is released on the hydraulic fluid, with that hydraulic fluid rearwardly of piston G being expelled through the passage X, as hydraulic fluid is discharged into the forward portion of cylinder A through a second passage Y (see FIGURE 1). Discharge of hydraulic fluid through passage Y need not be at high pressure, and serves only to move the piston G, rod H and punch J rearwardly to disengage the punch out of contact with the interior face of the tapered end L of tube M.

Thereafter the pin U is manually rotated to place it in a second position which so indexes the lugs W relative to the spaces between first lugs F that the jaws N and P can be moved forwardly relative to breech D. Jaw P can then be pivoted to the position shown in FIGURE 9, and the flared end L of tube M removed from the first die S. The operation above described is repeated with subsequent tubes M when it is desired to grip the flared ends L thereof during the time work is being performed on the tubes.

The detailed structure of the invention will be described hereinafter. The hydraulic cylinder A comprises a heavy-walled cylindrical shell 10 having two circumferentially extending lips 12 and 12' projecting from the ends thereof. Two recesses 14 and 14' are formed in lips 12 and 12' respectively and extend inwardly from the exterior faces thereof. Resilient O-rings 16 and 16' seat in recesses 14 and 14'.

The flange assembly B includes a circular flange 18 having a portion 20 projecting forwardly from the outer circumferential portion thereof. The forward face of portion 20 is in abutting contact with that part of the rear face of shell 10 which is in coaxial alignment therewith. O-rings 16 and 16' sealingly engage the interior surface of flange portion 20 as shown in FIGURE 1. A central bore 22 extends longitudinally through flange 18 which is preferably of larger transverse cross section than piston rod H.

A cylindrical sleeve 24 is longitudinally positioned and supported in bore 22. A first longitudinally extending groove 26 is formed in the interior face of sleeve 22 in which an O-ring 28 is seated, and ring 28 is in slidable sealing contact with the exterior surface of piston rod H. Sleeve 24 also has a second circumferentially extending groove 30 formed on the outer surface thereof. An O-ring 32 is mounted in groove 30 that is in fluid-sealing engagement with the surface of bore 22 in flange 18. A circular rib 34 is formed on the forward end of sleeve 24 that extends outwardly over the forward face of flange 18, adjacent bore 22. Sleeve 24 is held in a fixed position on flange 18 by a number of screws 36 which extend rearwardly through bores formed in rib 34 to engage coaxially aligned tapped bores formed in the flange. A number of circumferentially spaced longitudinally extending bores 38 are formed in flange 18 that are adapted to be coaxially aligned with like bores 38a which extend longitudinally through shell 10. Bores 38 and 38a are adapted to be aligned with tapped cavities 38b formed in breech D. A number of screws 40 are provided that have threaded ends 42 which engage the tapped cavities 38b. The cylindrical heads 43 of screws 40 are adapted to be fully positioned within the confines of cylindrical recesses 44 which extend forwardly from the rear face of flange 18 and communicate with bores 38. When tightened, screws 40 serve to draw flange 18 and breech D into abutting contact with the rear and forward ends of shell 10, as best seen in FIGURE 1.

A number of circumferentially spaced bores 46 extend through flange 18 that are outwardly disposed in the flange relative to shell 10. Bores 46 have a number of bolts 48 extending rearwardly therethrough. Bores 46 are in coaxial alignment with a number of circumferentially spaced, longitudinally extending bores 50 formed in flange C that is attached to the machine on which the invention is mounted.

The breech D, as can best be seen in FIGURES 1 and 9, is preferably circular, and fabricated from a solid steel block. A bore 52 extends longitudinally through breech D and is in communication with the cavity E. Bore 52 serves to slidably support the forward portion of piston rod H. The piston G (FIGURE 1) is fabricated from steel or the like, and is of heavy construction, preferably formed from a ring-shaped member 54 that is welded or otherwise affixed to the exterior surface of piston rod H. Piston rod H, for reasons to be hereinafter outlined, preferably has a bore 56 extending throughout the length thereof. A groove 58 extends circumferentially around piston G in which a resilient O-ring 60 and two back-up rings 62 are seated that are in slidable, fluid-sealing contact with the interior surface 64 of hydraulic cylinder A. The exterior longitudinal surface of piston G is preferably covered with a thin film 66 of a material which is adapted to slidably and sealingly contact the interior surface 64 of cylinder A. Film 66 is formed in two bands that extend from the forward and rear edges of piston G to the sides of groove 58.

The forward end of piston rod H develops into a circumferentially extending lip 68 of square longitudinal cross section. A back-up ring 70 is provided that has a rearwardly disposed circumferentially extending recess 72 formed therein which snugly engages the lip 68 (FIGURE 1). A number of screws 74 are provided that extend through bores formed in a circular rib 76 which projects from back-up ring 70 to engage a number of tapped recesses 78 which extend rearwardly in the piston rod H from the forward faces of lip 68. Back-up 70 is formed with a forwardly projecting tubular boss 80 on the forward portion of which threads 82 are formed that engage complementary threads 84 formed on the rear exterior surface of punch J. First jaw N is of heavy construction, and preferably formed as a casting from steel, or the like. Jaw N comprises a central portion 86 from which two legs 88 and 90 project upwardly and outwardly. A semi-circular recess 92 is formed in the upper part of portion 86 and is situated between the two legs 88 and 90. The first semicylindrical die holder Q is rotatably supported in the recess 92, as shown in FIGURE 9.

Identical, heavy bosses 94 project rearwardly from jaw portion 86 and the two legs 88 and 90. The supporting means O include three heavy rods 96 that extend rearwardly through bores 98 formed in bosses 94 and the jaw N. Rods 96 are rigidly affixed to bosses 94 by conventional means. The exterior surfaces of rods 96 are smooth, and these rods are slidably supported in longitudinally aligned bearings 98 positioned in three bores 99 formed in blocks 100, as shown in FIGURE 1. Each block 100 has a cap 101 affixed to the rear face thereof by screws 103. A bore 101a is formed in each cap 101 through which a rod 96 extends. Ring-shaped sealing members 105 and 106 are positioned in blocks 100 as shown. Each of the rods 96 (FIGURE 1) has a ring-shaped stop 107 formed on the rear end thereof.

Recess 92, as may also be seen in FIGURE 1, is defined by a flat semi-cylindrical central surface 102, from the rear edge of which a first rib 104 extends upwardly. The forward edge of surface 102 defines the upper edge of a recess 106 formed in jaw N. The forward face 108 of rib 104 tapers downwardly and rearwardly.

A second circumferentially extending recess 110 is formed in the forward exterior surface of first die holder Q that can be brought into vertical alignment with recess 106. Also formed on the exterior forward portion of die holder Q is a second rib 112, the rear face of which slopes upwardly and forwardly at the same angle that face 108 slopes downwardly and rearwardly. A semicircular metal strip 114 is provided that is of such width as to fit within the confines of recesses 106 and 110, as shown in FIGURE 1. A number of screws 116 extend through circumferentially spaced bores formed in strip 114 to engage longitudinally aligned tapped bores formed in jaw N.

By the above described construction the first die holder Q is rotatably interlocked and supported on first jaw N. When die holder Q is so supported, the first lugs W formed as an integral part thereof are rearwardly disposed relative to first jaw N as shown in FIGURE 1.

Second jaw P is of semi-circular configuration (FIGURE 9) and has a bifurcated first end portion 118 into which a lug 120 projects. Lug 120 is mounted on the inwardly disposed portion of first jaw leg 90. A horizontally positioned pin 122 extends through aligned bores formed in end portion 118 and a bore (not shown) in lug 120 to pivotally support second jaw P relative to first jaw N. Jaw P also has a second bifurcated end portion 124 that is adapted to slidably and snugly engage a rigid elongate member 126 mounted on the upper inner portion of jaw leg 88. End portion 124 and member 126 are in engagement when jaws N and P are in the closed position (FIGURE 2). Jaw P has a first rib 128 which projects downwardly from the rear inner portion thereof, as shown in FIGURE 3, which rib has a downwardly and forwardly tapering face 130. Second die holder Q has a second circumferentially extending rib 132 projecting upwardly from the outer surface thereof. The rear face of rib 132 tapers upwardly and rearwardly at the same angle that face 130 tapers downwardly and forwardly.

First and second ribs 128 and 132 are adapted to rotatably interlock when so held by a semi-circular metal strip 134 that slidably engages the forwardly disposed faces of the ribs. Strip 134 is removably disposed in two semi-circular recesses 136 and 138 formed in the adjoining forward faces of second jaw P and second die holder R respectively. Strip 134 is attached to jaw P by a number of circumferentially spaced screws 140 that project through bores in the strip to engage aligned tapped recesses formed in the second jaw, as shown in FIGURES 2 and 3.

The first and second dies S and T are structurally identical. Each of the dies includes a forwardly disposed semi-cylindrical portion 142 (FIGURE 9), the rear portion 144 of which is of heavier wall thickness, and in which an interior semi-cylindrical surface 146 is defined. Surface 146 tapers rearwardly and outwardly at the same angle as the face K of punch J tapers forwardly and inwardly. At the junction thereof, the exterior surfaces of portions 142 and 144 define flat, semi-circular body shoulders 148.

The die holders Q and R have identical longitudinally aligned recesses 150 formed in the faces 152 thereof, which faces are in abutment when the jaws N and P are closed, as shown in FIGURE 2. Recesses 150 are complementary to the exterior curved surfaces of dies S and T. When dies S and T are positioned in recesses 150, the body shoulders 148 abut against complementary body shoulders 154 formed in the die holders Q and R. Dies S and T are removably held in recesses 150 by conventional means, such as friction fit, screws, or the like (not shown). As previously mentioned, a circumferentially extending slot V is formed in jaw P in which the pin U is radially disposed relative to die holders Q and R when the jaws N and R are in the closed position. Pin U has a lower threaded end portion 158 that engages a radially positioned tapped bore 160 formed in second die holder R.

A ball 162 is mounted on the outer end of pin U. Pin U also has a sleeve 164 slidably mounted thereon that is at all times urged inwardly toward jaw P by a compressed helical spring 166. Spring 166 encircles pin U, with one end of the spring abutting against ball 162 and the other end against sleeve 164. Four engageable members 165 extend outwardly from the upper portion of sleeve 164 and are disposed at right angles to one another. The second jaw P has two pairs of circumferentially spaced slots 170 and 172 formed therein. When the jaw is in the closed position (FIGURE 2) and pin U is moved to a position where two of the coaxially aligned members 165 can be disposed in the pair of slots 170, the first and second die holders Q and R are concurrently rotated to positions where the lugs W on the rear ends thereof can be slid through the spaces between lugs F (FIGURE 9). Jaws N and P can then be moved rearwardly as an assembly relative to breech D.

After lugs W are so disposed within the confines of cavity E of breech D, the pin U is then rotated in slot V to a position where two of the members 165 can be removably positioned in slots 172. This movement of pin U causes concurrent rotation of the die holders Q and R to place the lugs W formed thereon directly behind the lugs F formed on breech D. Movement of the pin U to dispose the sleeves 164 in the pairs of slots 170 and 172 permits indexing of the die holders Q and R either out of longitudinal alignment to permit rearward movement of jaws N and P relative to breech D, or to bring lugs W and F into longitudinal alignment after the lugs W are in cavity E so that the force exerted by the punch J will be taken by the lugs F when the tapered end L of member M is being gripped. It will be seen in FIGURE 1 that lugs W have faces 174 that can contact faces 176 of lugs F, as shown in FIGURE 1. Faces 174 taper forwardly and away from the rear faces of lugs W, and faces 176 taper rearwardly and away from the forward faces of lugs F. When pressure is applied to the interior face of tapered end L of tube M by punch J as shown, the lugs F and W interlock longitudinally as well as radially.

In certain operations performed on tube M, as described in copending application Serial No. 512,061, it is desirable to use an elongate mandrel 178 inside the tube, as shown in FIGURE 1. The bore 56 in rod H, bore 180 in back-up ring 70, bore 182 in punch J permit longitudinal movement of the mandrel through the tube M, as well as the jaw assembly.

A number of pairs of dies S and T are preferably provided with the invention. Each pair of dies S and T have the same external dimensions to permit them to be interchangeably mounted in die holders Q and R, but are of different internal dimensions to permit the invention to handle tubes M of varying diameters.

The flange C also has a series of circumferentially spaced bores 184 formed therein that are on a bolt circle diameter greater than that of bores 50. Bores 184 permit a jaw assembly of the same structure as shown in FIGURE 9, but of larger dimensions, to be supported from flange C.

It will be obvious to those skilled in the art that various changes may be made in the invention without departing from the spirit and scope thereof, and therefore the invention is not limited by that which is shown in the drawings and described in the specification, but only as defined in the appended claims.

I claim:

1. A tube-gripping mechanism for removably gripping a flared end of a tubular member, including: a hydraulic cylinder having forward and rear ends; flange means that close the rear end of said cylinder; a cylindrical breech which closes the forward end of said cylinder, said breech being formed with a forwardly disposed cavity as well as a plurality of circumferentially spaced first lugs that project into said cavity; a piston slidably mounted in said cylinder; a piston rod affixed to said piston and slidably and sealingly mounted in longitudinally aligned first and second bores formed in said flange means and breech respectively, which second bore is in communication with said cavity; a punch mounted on the forward end of said rod, said punch having a frusto-conical forwardly disposed face that is complementary to the interior surface of said flared end; a first jaw situated forwardly of the lower half of said breech; first supporting means that permit said first jaw to be moved longitudinally relative to said breech; a second jaw pivotally supported on said first jaw; first and second semi-cylindrical die holders rotatably but removably supported on said first and second jaws, said die holders being formed with second circumferentially spaced lugs on the rear portions thereof; first and second semi-cylindrical dies positioned in longitudinally extending grooves formed in the faces of said die holders that are adjacently disposed when said second jaw is pivoted to a closed position with said first jaw, with each of said dies defining a second frusto-conical surface that is complementary to the exterior surface of said flared end; means to concurrently rotate said first and second die holders when said first and second jaws are in a closed position to longitudinally align said second lugs with spaces between said first lugs to permit said die holders and first and second jaws to be moved rearwardly relative to said breech to dispose said second lugs in said cavity, and thereafter rotate said die holders to place said first and second lugs in longitudinal alignment; and means to discharge hydraulic fluid into said cylinder rearwardly of said piston at a desired pressure to force said piston, piston rod and punch forwardly for said punch to pressure contact and frictionally grip said flared end disposed between said frusto-conical faces of said punch and dies.

2. A tube-gripping mechanism as defined in claim 1 wherein said first jaw member comprises a rigid body having a central portion from which first and second legs extend upwardly and outwardly, said body being formed with a longitudinally extending recess of semi-circular transverse cross-section in which said first die holder is rotatably supported.

3. A tube-gripping mechanism as defined in claim 2 wherein said second jaw has a longitudinally extending recess formed therein in which said second die holder is rotatably supported, and said second jaw and second die holder are provided with engageable and engaging means that removably hold said second die holder in said rotatably supported position.

4. A tube-gripping mechanism as defined in claim 3 wherein said means for rotating said die holders is a pin that extends outwardly from one of said die holders and is normally positioned relative to the longitudinal axis thereof.

5. A tube-gripping mechanism as defined in claim 4 wherein said second jaw is provided with means that limit the extent said pin can rotate said first and second die holders to between a first position and a second position, which pin when in said first position longitudinally indexes said second lugs with said spaces between said first lugs, and when in said second position indexes said second lugs longitudinally with said first lugs.

6. A tube-gripping mechanism as defined in claim 4 wherein the free end of said second jaw is provided with engaging means and said first jaw with rigid engageable means, which engaging and engageable means interlock when said first and second jaws are closed to prevent forward movement of said first jaw when said punch applies a forwardly directed force on said flared end of said tubular member.

7. A tube-gripping mechanism as defined in claim 6 wherein the forward faces of said first lugs taper rearwardly and outwardly and the rear faces of said second lugs taper forwardly and outwardly, which first and second lugs, due to said tapered faces, interlock when said second lugs are in said cavity in said breech and said first and second die members are in said second position to prevent forward movement of said first and second die holders relative to said breech, with said first and second lugs also being radially interlocked to prevent inward movement of said second lugs relative to said first lugs when said punch is moved forwardly to exert a force on said flared end of said tubular member.

8. A tube-gripping mechanism as defined in claim 6 wherein said piston rod and said punch each have a longitudinally aligned bore formed therein of substantially the same interior diameter as that of said tubular member to permit an elongate mandrel of slightly smaller cross section than that of said bores to be extended through said tubular member, punch and piston rod when said flared end of said tubular member is being gripped between said punch and said dies.

9. A die holder for use in a tube-gripping mechanism, including: a semi-cylindrical rigid body having a die-receiving recess formed therein that originates at a forward end of said body and extends downwardly into said body from the flat face thereof, said recess being centered on the longitudinal axis of said body; a rib extending outwardly from the semi-circular curved surface of said body and normally disposed relative to said longitudinal axis, with the width of said rib being greater at the outer portion thereof than the portion of said rib adjacent said body; and a plurality of circumferentially spaced lugs that extend outwardly from the semi-circular surface of said body, said lugs being normally disposed relative to the center line of said body, which lugs are spaced rearwardly from said rib on said body.

References Cited in the file of this patent

UNITED STATES PATENTS

| | | |
|---|---|---|
| 2,336,771 | Beaman | Dec. 14, 1943 |
| 2,585,944 | Kroeger | Feb. 19, 1952 |
| 2,985,455 | Powell | May 23, 1961 |